Patented Feb. 21, 1939

2,147,703

UNITED STATES PATENT OFFICE 2,147,703

CELLULOSE DERIVATIVE COMPOSITION

Gilman S. Hooper, Waynesboro, Va., assignor to E. I. du Pont de Nemours & Company, Wilmington, Del., a corporation of Delaware No Drawing. Application July 24, 1936, Serial No. 92,469

7 Claims. (Cl. 106—40)

This invention relates to a new composition of matter, more particularly the invention relates to a new ester of beta keto substituted alcohols, such as, for example, diacetone alcohol, and the lower members of the aliphatic acids and keto aliphatic acids, and their use in cellulose derivative compositions.

It is an object of the present invention to provide new esters which have particular utility as solvents or plasticizers in organic acid cellulose derivative compositions.

It is another object of this invention to provide a solvent or plasticizer for a cellulose derivative composition which shall be relatively water-soluble and have a substantially high-boiling point.

It is a further object of this invention to produce an improved cellulose derivative composition which will have a wide range of application.

It is a more specific object of this invention to provide a flexible, cellulose derivative thread containing an improved plasticizer or solvent which is relatively water-soluble and has a substantially high-boiling point.

Other objects of the invention will appear hereinafter.

The objects of the invention may be achieved, in general, by reacting a beta keto substituted alcohol with a lower member of an aliphatic acid or a keto aliphatic acid to form a new ester of the type which may be represented by the formula:

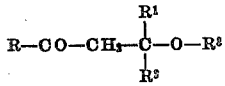

wherein $R$, $R^1$, $R^2$ represent low molecular weight alkyl groups, that is alkyl groups having less than four carbon atoms, which may be similar or dissimilar to each other, and $R^3$ represents an aliphatic acyl radical or a keto aliphatic acyl radical having less than six carbon atoms. The ester may be incorporated in a cellulose derivative composition and various products such as plastics, wrapping tissue, photographic film, artificial silk or the like formed therefrom, or, in the case of certain articles, such as artificial silk, the ester may be applied thereto after the formation thereof.

The invention will be described with particular reference to the use of the new esters as solvents or plasticizers for cellulose acetate, it is to be understood, however, that the invention in its broad aspects contemplates the use of these esters as solvents or plasticizers in cellulose derivative compositions generally. As examples of other cellulose derivatives to which the new esters may be applied as solvents or plasticizers, may be mentioned the following esters: cellulose propionate, cellulose aceto propionate, cellulose acetostearate; and the following ethers: ethyl cellulose, methyl cellulose, buty cellulose and benzyl cellulose. The particular high-boiling, water-soluble ester which will have the desired solvent or swelling action on any particular cellulose derivative may be easily determined by anyone skilled in the art.

In order to more clearly set forth the invention, reference is made to the following specific examples disclosing the details of the invention. It is to be understood, however, that the invention is not to be limited by the details set forth in these examples:

Example I

Diacetone alcohol ($CH_3COCH_2$—$C(CH_3)_2$—$OH$) and levulinic acid ($CH_3COCH_2CH_2COOH$) are dissolved in benzene and then gently refluxed with ferric chloride as a catalyst until tests with a small sample indicate esterification is substantially completed. The resulting diacetone levulinate is a solvent for cellulose acetate and boils with slight decomposition at 215° C.

To an acetone spinning solution, containing 26% cellulose acetate, is introduced 15% of diacetone levulinate, based on the weight of the finished yarn, and the mixture is thoroughly agitated until the diacetone levulinate is uniformly distributed throughout. The modified spinning solution is filtered, if desired, and then converted into a 150 denier thread, consisting of 50 filaments by standard dry spinning methods. Substantially none of the high-boiling diacetone levulinate is volatilized during spinning so that the resulting thread is unusually flexible and pliant and is admirably suited to textile operations, such as circular knitting, in which the thread is subject to sharp and rapid bending. After conversion of the modified threads into a fabric, the diacetone levulinate is removed by an aqueous bath treatment to produce a textile material having both freedom from fabrication defects and also good resistance to permanent deformation from stretching or creasing.

Example II

Diacetone alcohol is reacted with an excess of acetic anhydride in the presence of 1% of ferric chloride as catalyst. After completion of esterification, the diacetone acetate is obtained in a pure form by vacuum distillation. The diacetone acetate has a boiling point of 130-140° C. and is a solvent for cellulose acetate.

Based on the weight of the finished yarn, 25% of diacetone acetate is added to an acetone spinning solution containing 23% of cellulose acetate, and is uniformly distributed throughout by agitation for a short time. The spinning solution is then extruded through spinneret orifices into a heated spinning cell and the 150 denier thread consisting of 50 filaments, thus formed is later withdrawn in a set condition and wound upon a suitable collecting device.

The resulting cellulose acetate threads have good flexibility inasmuch as practically all the added diacetone acetate is retained in a uniform dispersion throughout the cross-section of the thread. The threads are then woven, knitted, or otherwise formed into fabrics after which their elasticity is improved by removal of the diacetone acetate with an aqueous bath treatment.

Example III

Diacetone alcohol and pyruvic acid are dissolved in benzene and then gently refluxed with ferric chloride as a catalyst until tests with a small sample indicate esterification is substantially completed. The resulting diacetone pyruvate is a solvent for cellulose acetate.

Based on the weight of the finished yarn, 10% of diacetone pyruvate is added to an acetone spinning solution containing 22% of cellulose acetate and is uniformly distributed throughout by suitable agitation for a short time. The spinning solution is then extruded through spinneret orifices into a heated spinning cell and thus formed into a 125 denier thread consisting of 50 filaments. The flexible thread may be readily woven, knitted or otherwise formed into a fabric having a remarkable freedom from fabrication defects.

While diacetone pyruvate, and particularly diacetone acetate and diacetone levulinate are preferred for the purpose of modifying the flexibility of cellulose acetate threads, still the other relatively high-boiling esters of the present invention may also be employed with advantage, provided proper adjustments are made for the volatility, water-solubility, and solvent action of the particular ester selected. As other esters of the invention suitable under proper conditions as cellulose acetate yarn modifiers may be mentioned diacetone formate, diacetone propionate, diacetone butyrate, and like esters of diacetone alcohol with a lower member of the aliphatic acid series as well as diacetone acetoacetate, diacetone dimethylacetoacetate, and like esters of low molecular weight aliphatic ketonic acids.

While acetone has been specified as the volatile solvent of the spinning solution, it will be recognized by those skilled in the art that almost any of the customary volatile solvents for cellulose acetate may be substituted, if desired. Thus methyl acetate, dioxane, or mixtures of ethyl alcohol and benzene, ethyl alcohol and acetone, or acetone and water may be employed instead of acetone. Depending on the amount added and the solvent action of the particular ester selected, a non-solvent for cellulose acetate such as xylene may be incorporated in the spinning solution in order to inhibit any undesirably strong solvent action on the cellulose acetate thread.

The amount of ester modifier to be added to the spinning solution may be varied within wide limits, depending largely upon the degree of flexibility desired for the threads and the solvent or plasticizing action of the particular ester chosen. Generally, it has been found that 5% to 25% and up to 30%, or more, based on the weight of the finished yarn, of the ester, gives excellent results.

Instead of introducing the esters in the spinning solution, the esters may, if desired, be applied in whole or in part to the finished yarn to increase the flexibility thereof. In this latter mode of application, the esters are preferably diluted to a sufficient extent that the threads do not dissolve appreciably or become noticeably tacky. The following example, which is not to be considered as limitative of the invention, illustrates this mode of operation:

Example IV

5%, based on the weight of the finished yarn, of diacetone levulinate is added and thoroughly distributed throughout an acetone spinning solution containing 23% of cellulose acetate. Threads spun from this solution in a heated evaporative cell are treated with the following yarn dressing composition:

| Constituents: | Parts by weight |
|---|---|
| Diacetone levulinate | 15 |
| Glycerin | 25 |
| Sulfonated animal or vegetable oil | 25 |
| Triethanolamine | 1 |
| Water | 23 |
| Dextrin | 2 |
| Soap | 1 |

This dressing composition is preferably applied to the cellulose acetate threads by passing them over a roller which rotates in the composition in such a fashion and at such a peripheral speed with respect to the linear speed of the thread that the amount of dressing uniformly applied is about 10-30% of the weight of the thread. The resulting thread may be satisfactorily and uniformly knitted into a circular knit fabric having 60 courses per inch without substantial degradation of the yarn.

It will, of course, be recognized by those skilled in the art that the cellulose acetate thread may also be treated additionally with other finishing agents regardless of the mode of application of the esters. As typical examples of customary finishing agents may be mentioned—olive oil, castor oil, cottonseed oil, Soya bean oil, peanut oil, teaseed oil, and animal, vegetable, or mineral oils and the like. The oils may be employed in an oxidized form, if desired. Likewise, water and a hygroscopic relatively non-volatile substance such as ethylene glycol, glycerin, diethylene glycol, propylene glycol, and like polyhydric alcohols or ether derivatives thereof may be applied to the cellulose acetate yarn in conjunction with the esters of the invention.

While the new esters of the invention are especially valuable in modifying the flexibility of cellulose acetate threads, the esters also may be applied to advantage in other arts, such as plastics, wrapping tissue, photographic film, coatings, and the like. Thus cellulose acetate sheets and films modified with the esters of the invention exhibit a greatly improved flexibility which is substantially permanent due to the relatively low volatility of these compounds. Such plasticized sheets and films find valuable application as interlayers, in the manufacture of laminated glass. In plastics, cellulose acetate compositions containing these esters may be used in the preparation of toilet ware, novelties, rods, tubes, etc.

In coating compositions and lacquers, the modified cellulose acetate compositions of the invention may be mixed with other materials such as damar, ester gum, polyhydric alcohol-polybasic acid resins, polyvinyl acetate resins, polymerized methyl methacrylate resins, phenolaldehyde resins, and like natural and synthetic resins, as well as pigments, powdered metals, rubber, and fillers.

The advantages of the invention are many. In the first place, the new esters are all solvents or swelling agents for cellulose acetate and are miscible with acetone and the usual solvents of cellulose derivative composition so that they may be incorporated therein to give compatible compositions which find valuable application in many diverse arts. Thus, in the thread art, the fact that the esters have a boiling point at or above approximately 130° C. insures that the quantity of the ester in the thread and consequently the capacity of the thread to be bent readily and sharply is substantially predetermined and equivalent to the amount of the modifier added to the spinning solution. This advantage is of considerable importance since in the production of closely knit fabrics, the thread is drawn around small turns and sharp corners at a fast rate and the lack of pliability of unmodified cellulose acetate thread has given rise to objectionable distortions and irregularity in the stitch formation and cutting or breaking of the filaments of the thread, as well as defects known in the art as "pin-holes" and "birds-eyes". Unmodified cellulose acetate threads taken from knitted fabrics both before and after finishing have exhibited severely degraded tenacity and elongation characteristics, and stress-strain curves of threads removed from unfinished fabric which is knit from cellulose acetate thread at 55 courses per inch have shown very material yarn degradation. Furthermore, this yarn degradation becomes rapidly more pronounced when the unmodified cellulose acetate yarn is subjected to knitting at a slightly higher stitch count. The essential nonvolatility and stability of the esters of the invention, together with the fact that in the preferred embodiment they are mostly held within the interstices of the thread, assure that the modified threads may be stored for a long period of time without losing their enhanced flexibility and pliability. Finally, the liquids are readily removable since they may be extracted easily with a water bath to give the finished fabric a highly desirable elasticity and resistance to deformation.

Obviously many changes and modifications can be made in the above detailed description without departing from the nature and spirit of the invention. The invention therefore, is not to be limited except as set forth in the appended claims.

I claim:

1. A cellulose derivative composition, containing as a plasticizer therefor, diacetone acetate.
2. A cellulose derivative composition, containing as a plasticizer therefor, diacetone levulinate.
3. A cellulose derivative composition, containing as a plasticizer therefor, diacetone pyruvate.
4. A cellulose derivative thread plasticized with diacetone acetate.
5. A cellulose derivative thread plasticized with diacetone levulinate.
6. A cellulose derivative thread plasticized with diacetone pyruvate.
7. A cellulose derivative thread plasticized with an ester taken from the group consisting of diacetone acetate, diacetone levulinate, diacetone pyruvate, diacetone formate, diacetone propionate, diacetone butyrate, diacetone acetoacetate and diacetone dimethylacetoacetate.

GILMAN S. HOOPER.